United States Patent
Kozlowski et al.

(12) 
(10) Patent No.: US 6,513,070 B1
(45) Date of Patent: Jan. 28, 2003

(54) MULTI-CHANNEL MASTER/SLAVE INTERPROCESSOR PROTOCOL

(75) Inventors: William L. Kozlowski, Novi, MI (US); David A. LaPorte, Livonia, MI (US); Weston J. Morris, Livonia, MI (US); Christopher N. St. John, Plymouth, MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/357,897

(22) Filed: Jul. 21, 1999

(51) Int. Cl.[7] .................................................. G06F 9/00
(52) U.S. Cl. ........................ 709/300; 709/238; 709/245
(58) Field of Search ................................. 709/300, 230, 709/231, 234, 245, 203, 400, 238; 710/20, 21, 22, 48, 100, 305, 307, 308, 316, 260–269; 370/351, 364

(56) References Cited

U.S. PATENT DOCUMENTS

| | | | | |
|---|---|---|---|---|
| 4,695,944 A | * | 9/1987 | Zandveld et al. | |
| 4,914,653 A | * | 4/1990 | Bishop et al. | 370/85.6 |
| 5,799,207 A | * | 8/1998 | Wang et al. | |
| 5,951,664 A | * | 9/1999 | Lambrecht et al. | 710/124 |
| 6,112,230 A | * | 8/2000 | Monch et al. | 709/208 |

FOREIGN PATENT DOCUMENTS

EP    0 483 549 A2   *   5/1992

* cited by examiner

*Primary Examiner*—Ario Etienne
(74) *Attorney, Agent, or Firm*—Ratner & Prestia; Lise A. Rode; Mark T. Starr

(57) ABSTRACT

A method and configuration for interprocessor communication provides reduced latency and complexity, as well as the ability to simultaneously transfer different types of data. A multi-channel interface is disposed between a slave processor and a master processor, wherein the multi-channel interface has a low-latency channel for transferring low-latency information and a high-throughput channel for transferring high-throughput information. The master processor interrupts the slave processor when the master processor has control information to transfer to the slave processor. Interrupt driven notification and the multi-channel interface provide reliable, high-speed communication between dissimilar processors.

6 Claims, 1 Drawing Sheet

MULTI-CHANNEL MASTER/SLAVE INTERPROCESSOR PROTOCOL

BACKGROUND OF THE INVENTION

1. Field of the Invention

The invention relates to interprocessor communications. More specifically, the invention concerns interprocessor protocols providing reduced latency and complexity, as well as the ability to simultaneously transfer different types of data.

2. Background Art

Banks, credit unions and other financial institutions often image checks, deposit slips and other types of bank documents in order to process financial transactions efficiently. Document processing systems have therefore become quite prevalent in the industry. In the performance of these critical functions, document processing systems commonly contain multiple microprocessor elements that are responsible for different tasks within the machine. In addition to their individual processing responsibilities, these processor elements are required to communicate with each other. Latency occurs when a processor foregoes its own processing functions because it is waiting for a response from another processor. The lost time created by latency therefore significantly compromises the performance of multiple processor systems and has generally resulted in increased complexity in an effort to address the problem. It is therefore desirable to allow processors to maximize efficiency by performing internal processing whenever external communication is not absolutely necessary.

In addition to the concern for latency, modern systems also generally require processing elements to be able to transfer high-bandwidth compressed data such as images or diagnostic traces. The dual role for processors in multiple processor systems thus presents the necessity for high-throughput data transfer as well as efficient communication. Single-channel configurations fail to adequately address these concerns and significantly add to processing time.

Another shortcoming of current approaches is the inability to readily diagnose hardware and software errors. For example, diagnostic information must typically be accessed from the main communication channel, which creates additional processing and communication delays. It is further desirable to allow one of the processors to use DMA operations to perform other tasks while the data is being transferred. The ability of the DMA processor to get immediate notification once the transfer is complete would therefore provide increased efficiency.

SUMMARY OF THE INVENTION

In a first aspect of the invention a method for interprocessor communication comprises the steps of transferring low-latency information between a first processor and a second processor across a first channel, and transferring high-throughput information between a first processor and a second processor across a second channel. The method interrupts the first processor to transfer control information to the first processor. The control information controls transfer of information across the first channel and the second channel.

In a second aspect of the invention, an interprocessor configuration comprises a master processor having a DMA controller, a slave processor, and a multi-channel interface disposed between the slave processor and the master processor. The multi-channel interface has a first channel for transferring low-latency information and a second channel for transferring high-throughput information. This aspect of the invention also comprises a protocol flag interface disposed between the slave processor and the master processor wherein the protocol flag interface is operable to transfer first channel interrupts between the master processor and the slave processor.

BRIEF DESCRIPTION OF THE DRAWING

The invention is set forth in exemplary fashion by the following detailed description of a preferred embodiment taken in conjunction with the drawing, in which.

DETAILED DESCRIPTION

Figure 1:
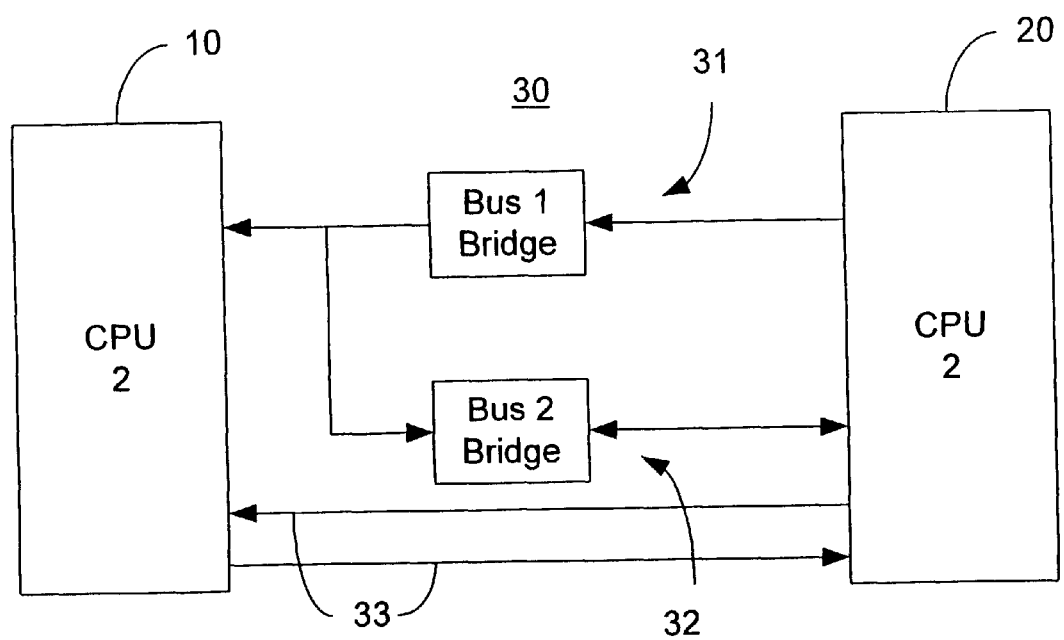
FIG. 1 is a diagram of an interprocessor configuration in accordance with the principles of the invention.

The invention divides high-throughput information from low-latency information during interprocessor communication. High-throughput information is data that often occupies the majority of communication time between processors. Low-latency information, on the other hand, is data that can be accessed at-will and therefore does not require either one of the processors to undergo significant latency. High-throughput information is generally on the order of megabytes whereas low-latency information is typically on the order of kilobytes. Generally, this division ultimately allows the simultaneous transfer of different data types.

Specifically, FIG. 1 indicates the preferred embodiment of the invention as implemented between a master processor 10 and a slave processor 20. A multi-channel interface 30 is disposed between the slave processor 20 and the master processor 10. The multi-channel interface 30 has a low-latency channel 32 for transferring low-latency information, and a high-throughput channel 31 for transferring high-throughput information. The use of multiple channels thus allows simultaneous transfers of different data types. Furthermore, diagnostic information can be accessed from either channel to aid in debugging communication failures. The invention also provides a protocol flag interface 33 disposed between the slave processor 20 and the master processor 10. The protocol flag interface 33 is operable to transfer low-latency channel interrupts between the master processor 10 and the slave processor 20.

In operation, the master processor 10 interrupts the slave processor 20 when the master processor 10 has control information to transfer to the slave processor 20. The slave processor 20 can continue to process and communicate via the high-throughput channel 31 while master processor 10 is transferring control information on low-latency channel 32. The control information controls transfer of information across both the low-latency channel 32 and the high-throughput channel 31. Thus, if the data to be transferred comprises high-throughput information, the transfer will take place across the high-throughput channel 31. Alternatively, if the data to be transferred comprises low-latency information, the transfer will take place across the low-latency channel 32.

Specifically, the method of interrupting the slave processor 20 includes the step of notifying the master processor 10 when the slave processor 20 has new data to transfer. The master processor 10 then identifies the data type for the data and authorizes the slave processor 20 to transfer the data to the master processor 10. This authorization takes place when the master processor 10 is ready to receive the data based on the data type. Thus, using well known interrupt driven notification principles allows the reduction of excess latency during communication.

The slave processor 20 notifies the master processor 10 that data is ready for transfer by issuing a notification protocol flag from the slave processor to the master processor across the protocol flag interface 33. The master processor 10 identifies the data type by issuing a data type request protocol flag to the slave processor 20 across the protocol flag interface 33. The data type request protocol flag interrupts the slave processor 20 while allowing the transfer of information across the high-throughput channel 31 to continue. The master processor 10 then issues a data type request command to the slave processor 20 across the low-latency channel 32. Upon receiving this data type request command, the slave processor 20 issues a data type message to the master processor 10 wherein the data type message contains the data type. The data type message is preferably transferred across the low-latency channel 32.

The master processor 10 authorizes the slave processor 20 to transfer the data by issuing an authorization protocol flag across the protocol flag interface 33. The authorization protocol flag interrupts the slave processor 20. Once again, communication across the high-throughput channel 31 is unaffected by the interruption. The master processor 10 then issues an authorization command across the low-latency channel 32. The authorization command controls data transfer across the low-latency channel 32 and the high-throughput channel 31. It can be appreciated that the information transferred across the high-throughput channel includes but is not limited to diagnostic trace information and image information. In the case of diagnostic trace information, the present invention allows both hardware and software errors to be diagnosed more easily than with a single communication channel.

The invention has been described with reference to a detailed description of a preferred embodiment for the sake of example only. The scope of the invention is to be determined by proper interpretation of the appended claims.

We claim:

1. A method for interprocessor communication comprising the steps of:
    transferring low-latency information between a first processor and a second processor across a first channel;
    transferring high-throughput information between the first processor and the second processor across a second channel; and,
    interrupting the first processor to transfer control information to the first processor, the control information controlling transfer of information across the first channel and the second channel, including the substeps of:
        notifying the second processor when the first processor has data to transfer;
        identifying a data type for the data and,
        authorizing the first processor to transfer the data to the second processor when the second processor is ready to receive the data based on the data type.

2. The method of claim 1, wherein the step of notifying the second processor includes the step of issuing a notification protocol flag from the first processor to the second processor, the notification protocol flag indicating that the first processor has data to transfer.

3. The method of claim 1, wherein the step of identifying the data type includes the steps of:
    issuing a data type request protocol flag from the second processor the first processor, the data type request protocol flag interrupting the first processor;
    issuing a data type request command from the second processor to the first processor across the first channel while the first processor is interrupted; and,
    issuing a data type message from the first processor the second processor, the data type message containing the data type.

4. The method of claim 1, wherein the steps of authorizing the first processor to transfer the data includes the steps of:
    issuing an authorization protocol flag from the second processor to the first processor, the authorization protocol flag interrupting the first processor; and
    issuing an authorization command across the first channel while the first processor is interrupted, the authorization command controlling data transfer across the first channel and the second channel.

5. The method of claim 1, wherein the high-throughput information comprises diagnostic trace information.

6. The method of claim 1, wherein the high-throughput information comprises image information.

* * * * *